United States Patent
Yoshikawa

(10) Patent No.: US 7,410,435 B2
(45) Date of Patent: Aug. 12, 2008

(54) HYDRAULIC PIPE MECHANISM FOR INDUSTRIAL VEHICLE

(75) Inventor: Masashige Yoshikawa, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 715 days.

(21) Appl. No.: 10/899,527

(22) Filed: Jul. 27, 2004

(65) Prior Publication Data

US 2005/0037880 A1 Feb. 17, 2005

(30) Foreign Application Priority Data

Aug. 4, 2003 (JP) .............................. 2003-205720

(51) Int. Cl.
*F16H 55/32* (2006.01)
*B66F 9/06* (2006.01)
(52) U.S. Cl. ....................... 474/168; 474/174; 474/169; 187/228
(58) Field of Classification Search ......... 474/167–168, 474/174–176, 152, 156; 187/226–229; D8/360; 254/393, 416; 384/169–170
See application file for complete search history.

(56) References Cited

U.S. PATENT DOCUMENTS

| 504,588 | A | * | 9/1893 | Johnson ....................... 474/176 |
| 527,306 | A | * | 10/1894 | Wern ........................... 254/393 |
| 2,315,301 | A | * | 3/1943 | Van Deventer et al. ...... 474/168 |
| 2,457,366 | A | | 12/1948 | Guerin ......................... 214/113 |
| 2,553,439 | A | * | 5/1951 | Carmichael ................... 474/62 |
| 2,625,447 | A | * | 1/1953 | Van Deventer .............. 474/168 |
| 2,979,162 | A | * | 4/1961 | Quayle ......................... 187/227 |
| 3,006,382 | A | * | 10/1961 | Broome ........................ 474/168 |
| 3,111,856 | A | * | 11/1963 | Backofen ..................... 474/165 |
| 3,125,126 | A | * | 3/1964 | Engels ......................... 474/168 |
| 3,289,870 | A | | 12/1966 | Quayle ......................... 214/672 |
| 3,894,616 | A | * | 7/1975 | Kawanishi et al. .......... 187/228 |
| 4,683,987 | A | | 8/1987 | Sakata et al. .................. 187/9 |
| D308,013 | S | * | 5/1990 | Kanemitsu .................... D8/360 |
| 5,992,571 | A | * | 11/1999 | Lee ............................. 187/228 |

FOREIGN PATENT DOCUMENTS

| FR | 1 576 693 | | 8/1969 |
| GB | 1 178 959 | | 1/1970 |
| GB | 1 212 436 | | 11/1970 |
| JP | 60-157795 | | 10/1985 |
| JP | 04003799 A | * | 1/1992 |
| JP | 05319792 A | * | 12/1993 |
| JP | 7-157295 | | 6/1995 |
| JP | 9-040390 | | 2/1997 |

\* cited by examiner

*Primary Examiner*—Marcus Charles
(74) *Attorney, Agent, or Firm*—Morgan & Finnegan, LLP

(57) ABSTRACT

A hydraulic pipe mechanism for an industrial vehicle includes a pulley shaft, a plurality of hydraulic hoses and a pulley set. The pulley set is provided on the pulley shaft and has at least first and second hose pulleys that are rotatably supported on the pulley shaft. The first and second hose pulleys are respectively located on sides of the pulley set and each has a guide groove for hooking the hydraulic hose therein. Each of the first and second hose pulleys has a pair of outer and inner flanges that form side walls of the guide groove respectively. Each outer flange is located on the side of the pulley set, and each inner flange is located inside the outer flange in the pulley set. Each outer flange has a first radius, and each inner flange has a second radius. The first radius is larger than the second radius.

10 Claims, 11 Drawing Sheets

HYDRAULIC PIPE MECHANISM FOR INDUSTRIAL VEHICLE

BACKGROUND OF THE INVENTION

The present invention relates to a hydraulic pipe mechanism for an industrial vehicle such as forklift truck.

In an industrial vehicle such as forklift truck, a front attachment is attached to a lift device for performing work. Generally, hydraulic pipes are arranged in the lift device for driving hydraulic equipment of the front attachment (refer to Japanese Unexamined Patent Publication No. 9-40390).

Japanese Unexamined Patent Publication No. 9-40390 discloses a hydraulic pipe mechanism of the forklift truck. Two hydraulic hoses are hooked in the guide groove of a hose pulley rotatably supported on a pulley shaft in the hydraulic pipe mechanism, thereby improving front visibility of operators of the industrial vehicles. However, there is a problem that the hydraulic hoses are easy to slide laterally in the guide groove.

To prevent the hydraulic hoses from sliding laterally in the guide groove of the hose pulley, hydraulic hoses 130 are respectively hooked in guide grooves 124 of hose pulleys 120 as shown in FIG. 11. Each hose pulley 120 has a pair of flanges 125 that respectively forms side walls of the guide groove 124 and is rotatably supported on the pulley shaft 117. In the hose pulley 120, a pair of the flanges 125 is formed with a radius $r_0$ that is larger than a dimension b from a rotational axis 120a of the hose pulley 120 to an axis 130a of the hydraulic hose 130 hooked in the guide groove 124. Thus, the hydraulic hoses 130 respectively move while being appropriately guided by the hose pulleys 120. However, there arises a problem that the front visibility of the operators of the industrial vehicles deteriorates.

Meanwhile, Japanese Unexamined Utility Model Publication No. 60-157795 discloses another hydraulic pipe mechanism. A cover plate corresponding to the flange that forms the side wall of the guide groove is merely provided at a side of the hose pulley in the hydraulic pipe mechanism. Thus, there arises the problem that the front visibility of operators of the industrial vehicles deteriorates similarly to the above hydraulic pipe mechanism of FIG. 11.

SUMMARY OF THE INVENTION

The present invention provides a hydraulic pipe mechanism for an industrial vehicle that improves the front visibility of operators while each hydraulic hose is appropriately guided by a hose pulley.

According to the present invention, a hydraulic pipe mechanism for an industrial vehicle includes a pulley shaft, a plurality of hydraulic hoses, and a pulley set. The pulley set is provided on the pulley shaft and has at least first and second hose pulleys that are rotatably supported on the pulley shaft. The first and second hose pulleys are respectively located on sides of the pulley set. Each of the first and second hose pulleys has a guide groove for hooking the hydraulic hose therein. Each of the first and second hose pulleys has a pair of outer and inner flanges that form side walls of the guide groove respectively. Each outer flange is located on the side of the pulley set, and each inner flange is located inside the outer flange in the pulley set. Each outer flange has a first radius, and each inner flange has a second radius. The first radius is larger than the second radius.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENT

A first preferred embodiment according to the present invention will be described. In the first preferred embodiment, a hydraulic pipe mechanism for a three-mast type forklift truck in which a front attachment in attached to a lift device for performing work is described as an example of a hydraulic pipe mechanism for an industrial vehicle.

Figure 1:
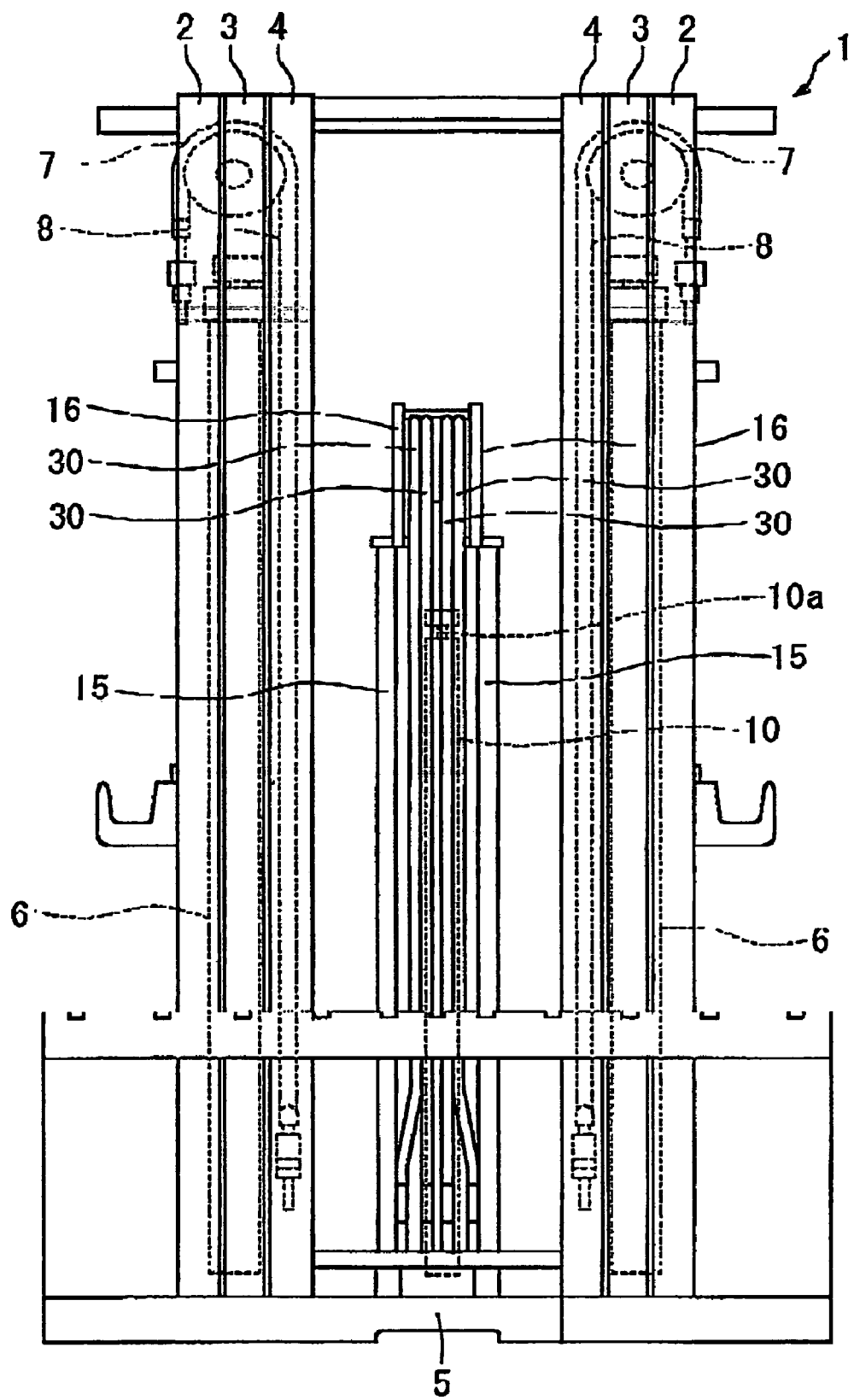
FIG. 1 is a schematic front view of a lift device of a forklift truck according to a first preferred embodiment of the present invention.

The lift device of the forklift truck will be described first. Since the lift device of the first preferred embodiment has substantially the same structure as in Japanese Unexamined Patent Publication No. 9-40390, it will be schematically described. As shown in FIG. 1, a pair of middle masts 3 is provided between outer masts 2 attached to a truck body (not shown) to move vertically in a lift device 1 of the forklift truck. A pair of inner masts 4 is provided between the middle masts 3 to move vertically. A carriage 5 is provided on the front side of the inner masts 4 to move vertically. A front attachment (not shown) having two hydraulic actuators is connected to the carriage 5.

A pair of lift cylinders 6 is provided on the rear side of the middle masts 3 to connect respectively the lower portions of the outer masts 2 to the upper portions of the middle masts 3. A pair of chain pulleys 7 is respectively provided at the upper portions of the rear side of the middle masts 3 to rotate on their rotational axes that extend in the longitudinal direction of the forklift truck or in the direction perpendicular to the plane of FIG. 1. Chains 8 are respectively hooked on the chain pulleys 7. One end of each chain 8 is connected to the upper portion of the associated outer mast 2, and the other end of each chain 8 is connected to the lower portion of the associated inner mast 4. Thus, stretching the lift cylinders 6 from a shortened state, the middle masts 3 are lifted along the outer masts 2 while the inner masts 4 are lifted along the middle masts 3 via the chains 8. On the other hand, retracting the lift cylinders 6 from a stretched state, the middle masts 3 are lowered along the outer masts 2 while the inner masts 4 are lowered along the middle masts 3 via the chain 8.

Although not shown, hose pulleys are respectively rotatably provided on the rear sides of the chain pulleys 7 provided on the middle masts 3 and coaxial with the chain pulleys 7. Four hydraulic hoses made of rubber are respectively hooked on the hose pulleys. One end of each hydraulic hose is connected to an associated pipe located on the truck body, and the other end of each hydraulic hose is connected to an associated pipe located on the lower portion of the inner mast 4.

A center cylinder 10 is mounted on a tie-beam (not shown) provided between the inner masts 4. A piston rod 10a protrudes upward from the center cylinder 10, and a chain wheel support 12 (refer to FIG. 2) is fixed to the upper end of the piston rod 10a.

Figure 2:
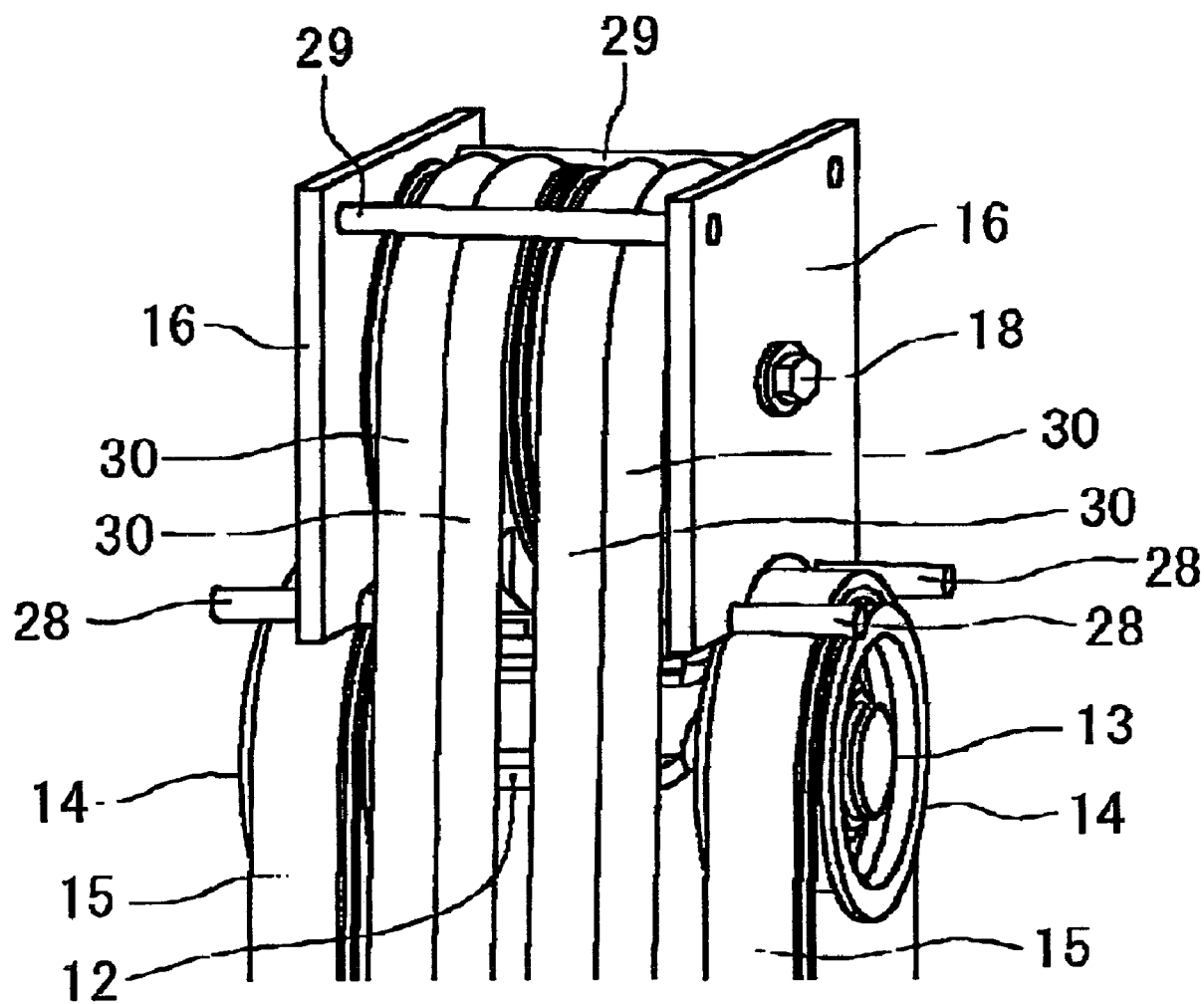
FIG. 2 is a perspective view of a hydraulic pipe mechanism according to the first preferred embodiment.

Referring to FIG. 2, a pair of chain wheels 14 is respectively and rotatably supported on a pair of wheel shafts 13 that protrudes coaxially and horizontally from the chain wheel support 12. Only the wheel shaft 13 on the right side is shown in FIG. 2. A pair of lift chains 15 is respectively hooked on the chain wheels 14. One end of each lift chain 15 is connected to the carriage 5, and the other end of each lift chain 15 is connected to the associated inner mast 4. Thus, stretching the center cylinder 10 from a shortened state, the carriage 5 is lifted along the inner masts 4 via the lift chains 15. On the other hand, retracting the center cylinder 10 from a stretched state, the carriage 5 is lowered along the inner masts 4 via the lift chains 15.

Next, the hydraulic pipe mechanism will be described. As shown in FIG. 2, a pair of pulley brackets 16 that are respectively formed by substantially rectangular plates is symmetrically connected to the chain wheel support 12.

Figure 3:
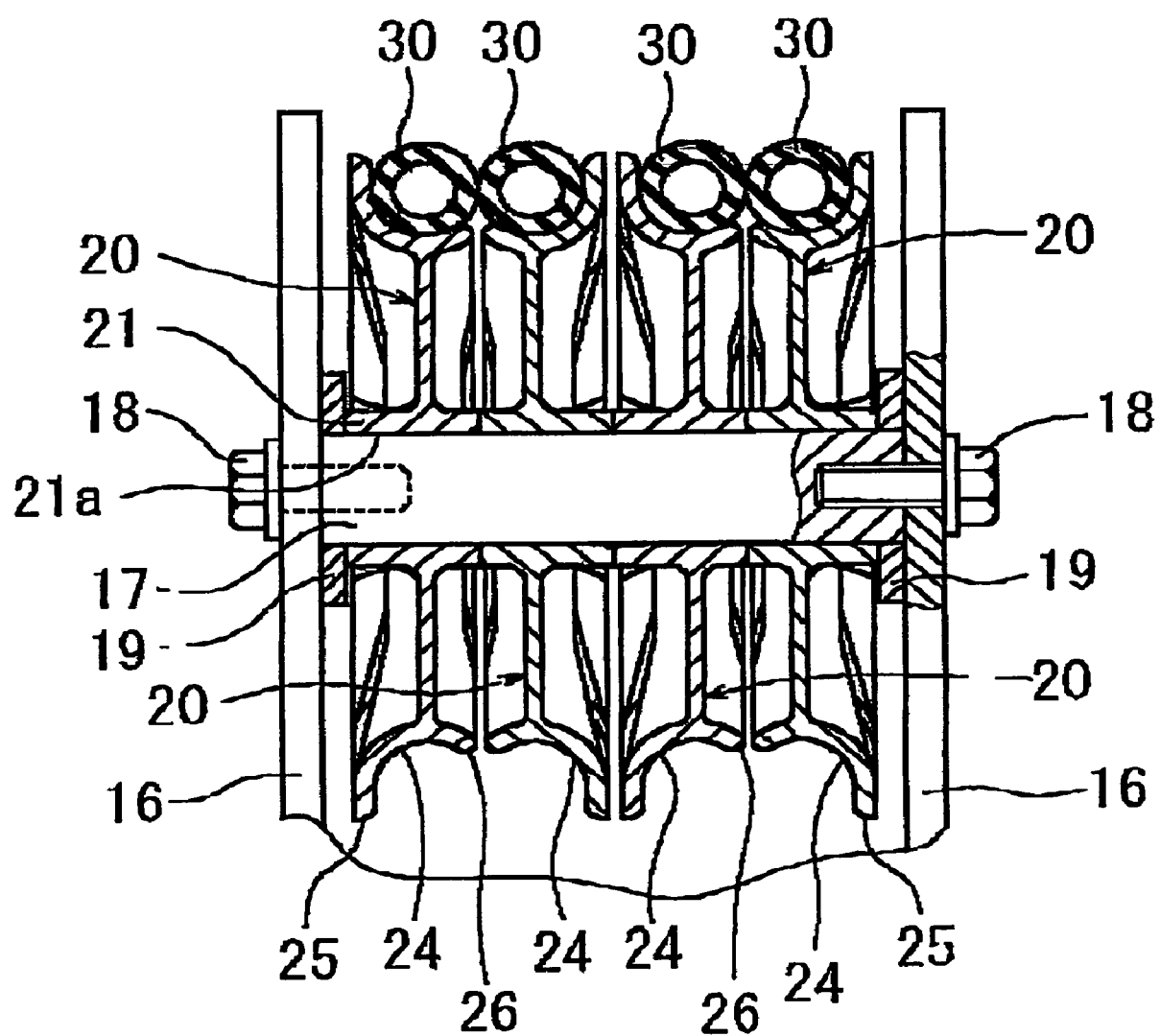
FIG. 3 is a cross-sectional front view of the hydraulic pipe mechanism according to the first preferred embodiment.

Referring to FIG. 3, a pulley shaft 17 is provided between the pulley brackets 16. Both ends of the pulley shaft 17 are respectively bolted to the pulley brackets 16 by bolts 18. However, it is presumable that the pulley shaft 17 is provided between the pulley brackets 16 in the fixing structure different from the above structure. For example, connecting portions are respectively provided to protrude radially from the ends of the pulley shaft 17, and a free end of each connecting portion is fixed to the pulley bracket 16 by a bolt or a screw.

Referring to FIG. 3, four hose pulleys 20 are rotatably supported on the pulley shaft 17. Four hydraulic hoses 30 made of rubber are respectively hooked on the hose pulleys 20. Although not shown, one end of each hydraulic hose 30 is connected to an associated pipe for the front attachment of the carriage 5, and the other end of each hydraulic hose 30 is connected to an associated pipe located on the lower portion of the inner mast 4. The pipes for the front attachment of the carriage 5 are connected to the two hydraulic actuators that are provided in the front attachment. The pipes located on the lower portion of the inner mast 4 are respectively connected to pipes on the truck body via hydraulic hoses hooked on the hose pulley that is located on the rear side of the chain pulley 7. Thus, the two hydraulic actuators of the front attachment are operable.

Each hose pulley 20 rotate in accordance with the stretching or retracting operation of the piston rod 10a of the center cylinder 10, while moving smoothly the hydraulic hose 30 along the guide groove 24.

Referring to FIG. 3, the hose pulleys 20 are positioned by a pair of collars 19 in the axial direction. Each collar 19 is fitted onto the pulley shaft 17 and interposed between the pulley bracket 16 and the adjacent hose pulley 20. Each two of the hose pulleys 20 are paired to form a pulley set, that is, there are two paired hose pulleys 20 located on the pulley shaft 17. The four hose pulleys 20 have substantially the same shape, and each paired hose pulleys 20 are symmetrically located.

Figure 5:
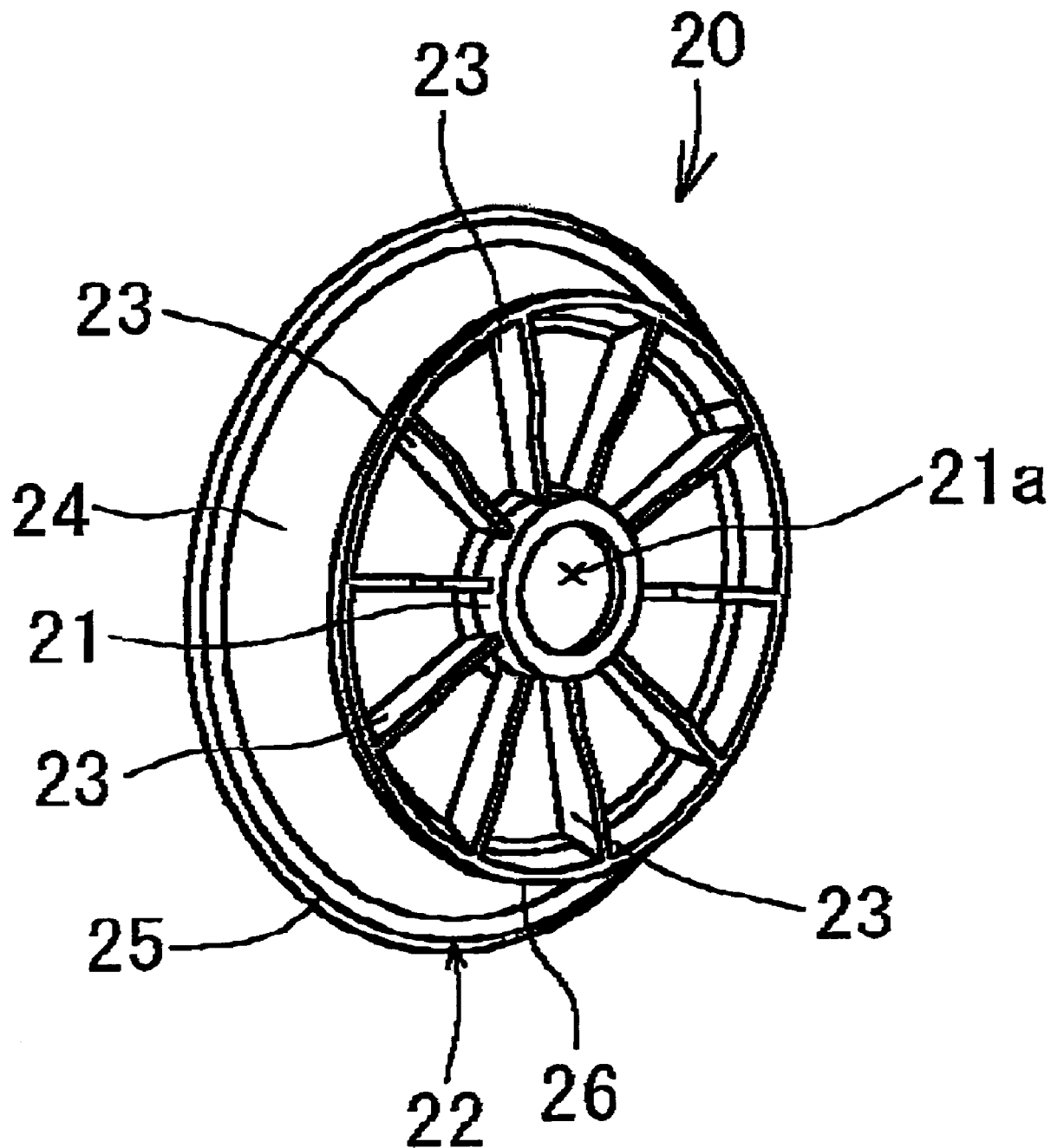
FIG. 5 is a perspective view of the hose pulley according to the first preferred embodiment.

Referring to FIG. 5, the hose pulley 20 includes a boss 21 having a shaft hole 21a, a rim 22 formed in its outer periphery and a plurality of arms 23 that radially extend and connect the boss 21 to the rim 22. The rim 22 has formed therein a substantially U-shaped guide groove 24 for hooking the hydraulic hose 30 therein. The rim 22 also has a pair of flanges 25, 26 that respectively forms the side walls of the guide groove 24. The hose pulley 20 is rotatably supported on the pulley shaft 17 in such a manner that the pulley shaft 17 is inserted through the shaft hole 21a of the boss 21 as shown in FIG. 3.

Figure 4:
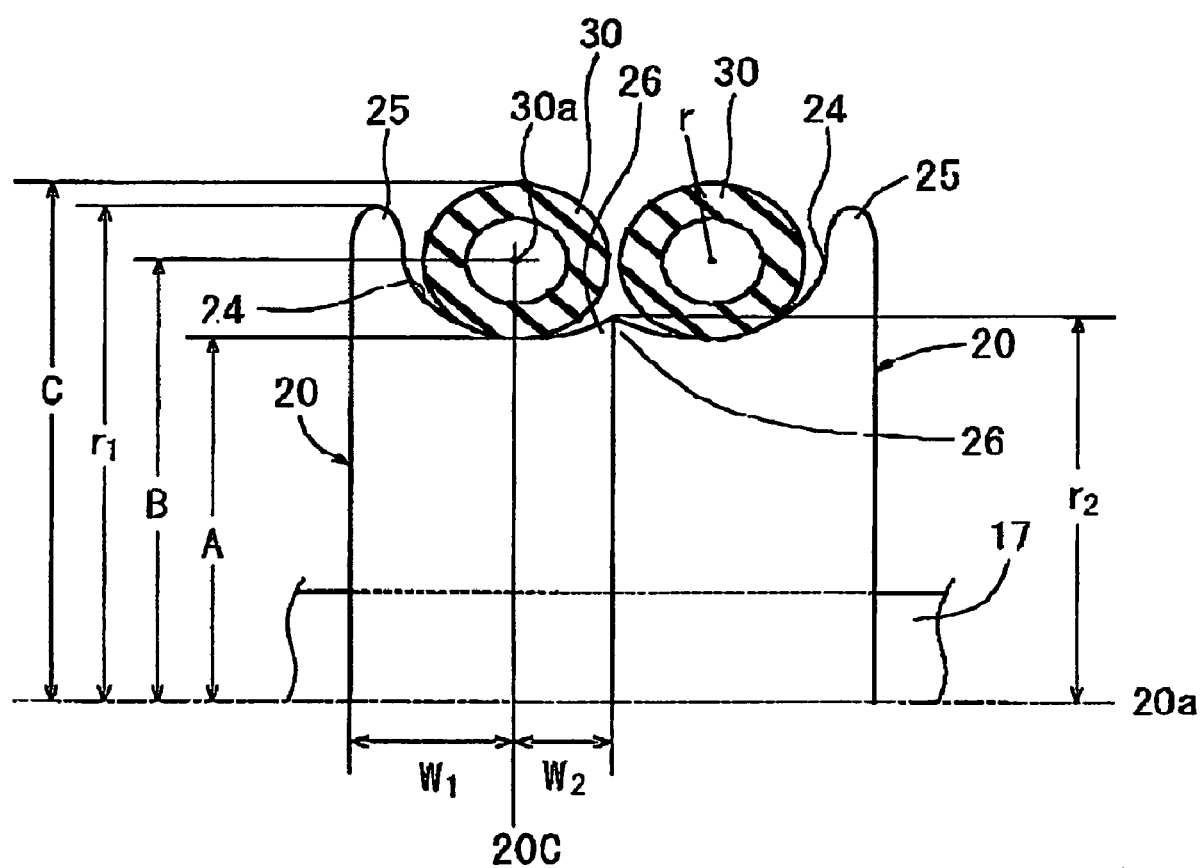
FIG. 4 is an explanatory view of paired hose pulleys in the hydraulic pipe mechanism according to the first preferred embodiment.

Referring to FIG. 4, a radius $r_1$ of the flange 25 of the hose pulley 20 and a radius $r_2$ of the flange 26 of the hose pulley 20 are set so as to satisfy the following inequality:

$$r_1 > r_2$$

For convenience of explanation, the flange 25 having the radius $r_1$ is called "the large radius flange 25, and the flange 26 having the radius $r_2$ is called "the small radius flange 26."

Referring to FIG. 4, the dimension from a rotational axis 20a of the hose pulley 20 to the groove bottom of the guide groove 24 is represented as "A." The dimension from the rotational axis 20a of the hose pulley 20 to an axis 30a of the hydraulic hose 30 hooked in the guide groove 24 is represented as "H." Also, the dimension from the rotational axis 20a of the hose pulley 20 to the outer periphery of the hydraulic hose 30 hooked in the guide groove 24 is represented as "C." The radius $r_1$ of the large radius flange 25 is larger than the dimension B and smaller than the dimension C, that is, the following inequality is satisfied.

$$B < C$$

The radius r2 of the small radius flange 26 is larger than the dimension A and smaller than the dimension B, that is, the following inequality is satisfied.

$$A < B$$

Referring to FIG. 4, the dimension from a standard line 20C orthogonal to the rotational axis 20a of the hose pulley 20 and the axis 30a of the hydraulic hose 30 to the outer peripheral surface of the large radius flange 25 is represented as "$W_1$." The dimension from the standard line 20C to the outer peripheral surface of the small radius flange 26 is represented as "$W_2$." Also, the radius of the hydraulic hose 30 (the half of the external diameter) is represented as "r." The dimensions $W_1$, $W_2$ are set so as to satisfy the following inequality:

$$W_1 > W_2 > r$$

Referring back to FIG. 3, the two paired hose pulleys 20 are rotatably supported on the pulley shaft 17 in such a manner that the outer peripheral surfaces of the small radius flanges 26 of each paired hose pulleys 20 face other.

Referring back to FIG. 2, a pair of bars 28 is respectively outwardly protrudes from the front and rear sides of the lower portion of each pulley bracket 16. The paired bars 28 face the lift chain 15 at a predetermined distance above the lift chain 15 to prevent that the lift chain 15 is unhooked from the associated chain wheel 14 due to vibration generated by traveling a vehicle.

A pair of bars 29 is respectively provided between the upper portions of the pulley brackets 16 on the front and rear sides. The paired bars 29 face above the hydraulic hoses 30 at a predetermined distance to prevent that the hydraulic hoses 30 is unhooked from the hose pulleys 20 due to the vibration generated by traveling the vehicle.

According to the above hydraulic pipe mechanism for the forklift truck, each two of the four hydraulic hoses 30 are paired. The four hydraulic hoses 30 are respectively hooked in the guide grooves 24 of the four hose pulleys 20 each two of which is paired and that are rotatably supported on the pulley shaft 17 (refer to FIG. 3). Also, the radius $r_1$ of the outer flange 25 of the hose pulleys 20 located on the sides of each paired hose pulleys 20 and the radius $r_2$ of the small radius flange 26 located inside the outer flange 25 in the paired pulleys 20 are set so as to satisfy the following inequality (refer to FIG. 4):

$$r_1 > r_2$$

Thus, each pair of the hydraulic hoses 30 are substantially prevented from being unhooked from the paired hose pulleys 20 due to the outer or large radius flanges 25 located on the sides of each paired hose pulleys 20. Also, each pair of the hydraulic hoses 30 moves while being appropriately guided by the paired hose pulleys 20. Furthermore, since the radius $r_2$ of the small radius flanges 26 located inside the large radius flanges 25 in the paired hose pulleys 20 is small, the front visibility of the operators of the industrial vehicles is improved. Therefore, while each pair of the hydraulic hoses 30 is guided by the paired hose pulleys 20, the front visibility of the operators of the industrial vehicles is improved.

The radius $r_1$ of the outer or large radius flanges 25 of the hose pulleys 20 located on the sides of each paired hose pulleys 20 is larger than the dimension B and smaller than the dimension C (refer to FIG. 4). Thus, while the large radius flanges 25 of the hose pulleys 20 substantially prevent the hydraulic hoses 30 from being unhooked from the hose pulleys 20, it is prevented that the large radius flanges 25 disturb the front visibility of the operators of the industrial vehicles. Also, the radius $r_2$ of the small radius flanges 26 located inside each paired hose pulleys 20 is larger than the dimension A and smaller than the dimension B (refer to FIG. 4). Thus, while the front visibility of the operators of the industrial vehicles is improved due to the small radius flanges 26 of the hose pulleys 20, the hydraulic hoses 30 are prevented from sliding laterally.

Referring to FIG. 4, the dimension $W_1$ between the standard line 20C and the outer peripheral surface of the large radius flange 25 and the dimension $W_2$ between the standard line 20C and the outer peripheral surface of the small radius flange 26 are set so as to satisfy the following inequality in comparison to the radius r of the hydraulic hose 30 (refer to FIG. 4):

$$W_1 > W_2 > r$$

Thus, while the adjacent hydraulic hoses 30 are prevented from contacting each other, the front visibility of the operators of the industrial vehicles is further improved by reducing occupation widths of the hose pulleys 20 in the axial direction.

A second preferred embodiment according to the present invention will be described. The second preferred embodiment and other following preferred embodiments are modifications of the first preferred embodiment. Thus, only modified portions are described in detail, and repeated description is omitted.

Figure 6:
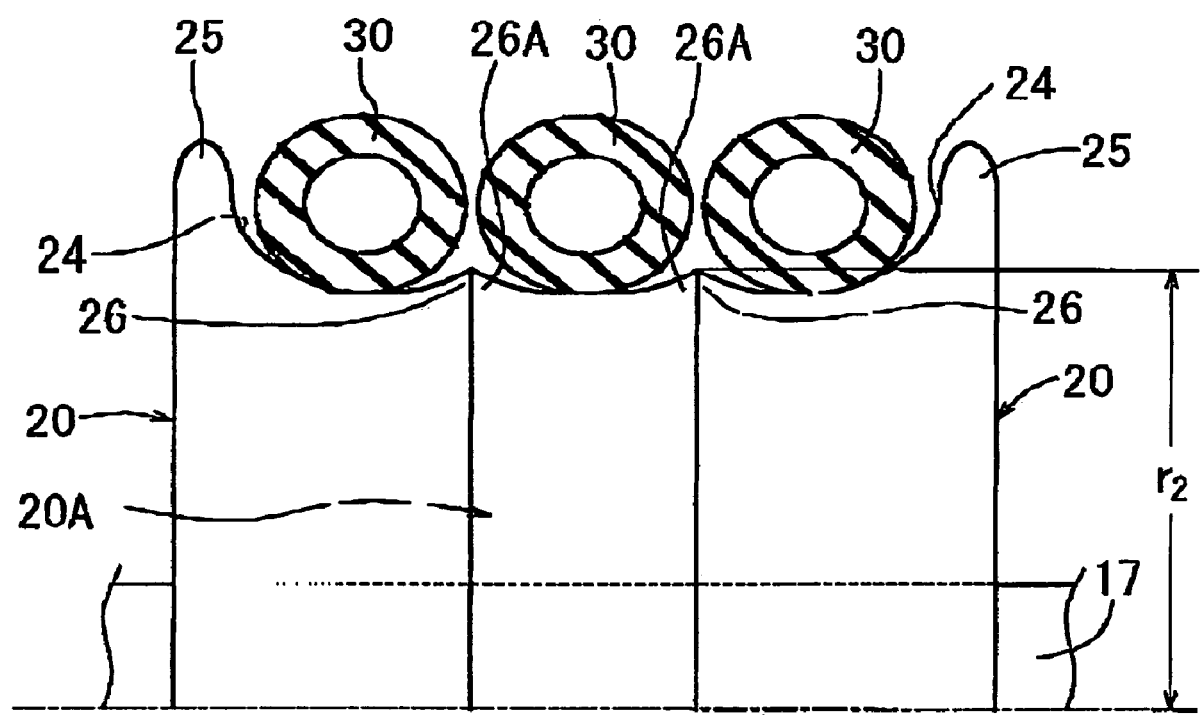
FIG. 6 is an explanatory view of a hydraulic pipe mechanism according to a second preferred embodiment.
Figure 7:
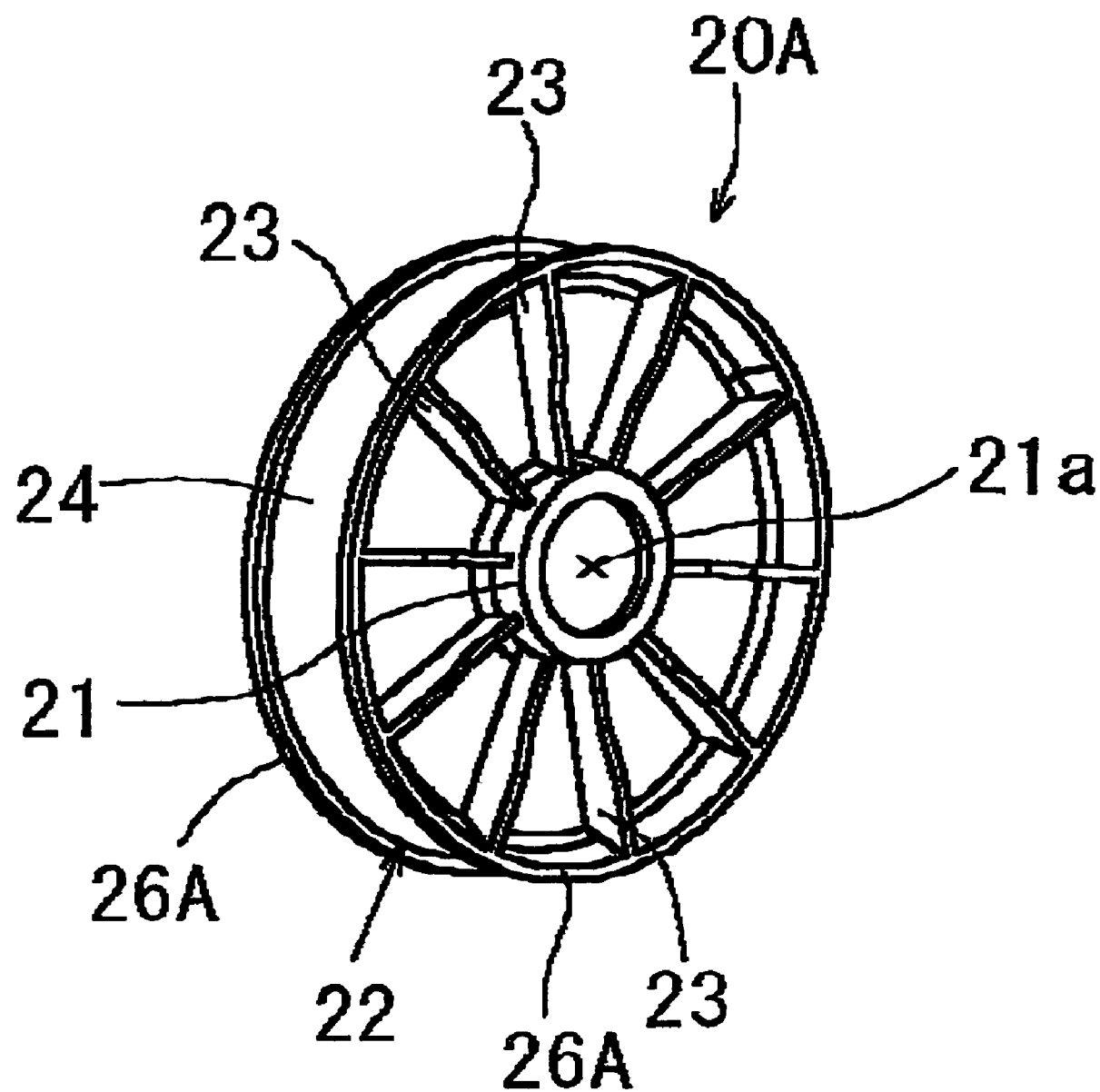
FIG. 7 is a perspective view of an intermediate hose pulley according to the second preferred embodiment.

Referring to FIG. 6, an intermediate hose pulley 20A is interposed between a pair of the hose pulleys 20 in the second preferred embodiment. The intermediate hose pulley 20A is rotatably supported on the pulley shaft 17 together with the hose pulleys 20. As shown in FIG. 7, the intermediate hose pulley 20A has a structure similar to the hose pulley 20 (refer to FIG. 5). However, in the intermediate hose pulley 20A, a pair of small radius flanges (referred to as 26A) is symmetrically formed with substantially the same radius $r_2$ as the small radius flange 26 (refer to FIG. 4).

According to the second preferred embodiment, the same advantageous effects are obtained as in the above-described first preferred embodiment. Also, the three hydraulic hoses 30 move while being guided by three hose pulleys, namely, a pair of the hose pulleys 20 located on the sides and the intermediate hose pulley 20A. Furthermore, since the small radius flanges 26A of the intermediate hose pulley 20A is small, the front visibility of the operators of the industrial vehicles is further improved.

Figure 8:
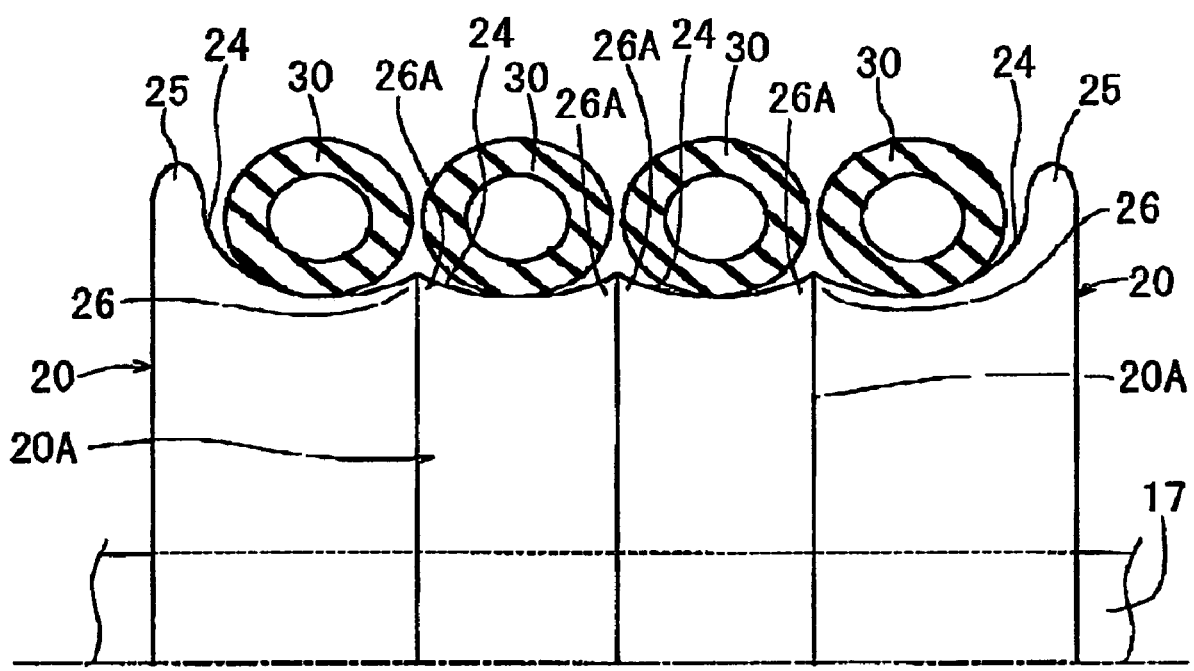
FIG. 8 is an explanatory view of a hydraulic pipe mechanism according to a third preferred embodiment.
Figure 9:
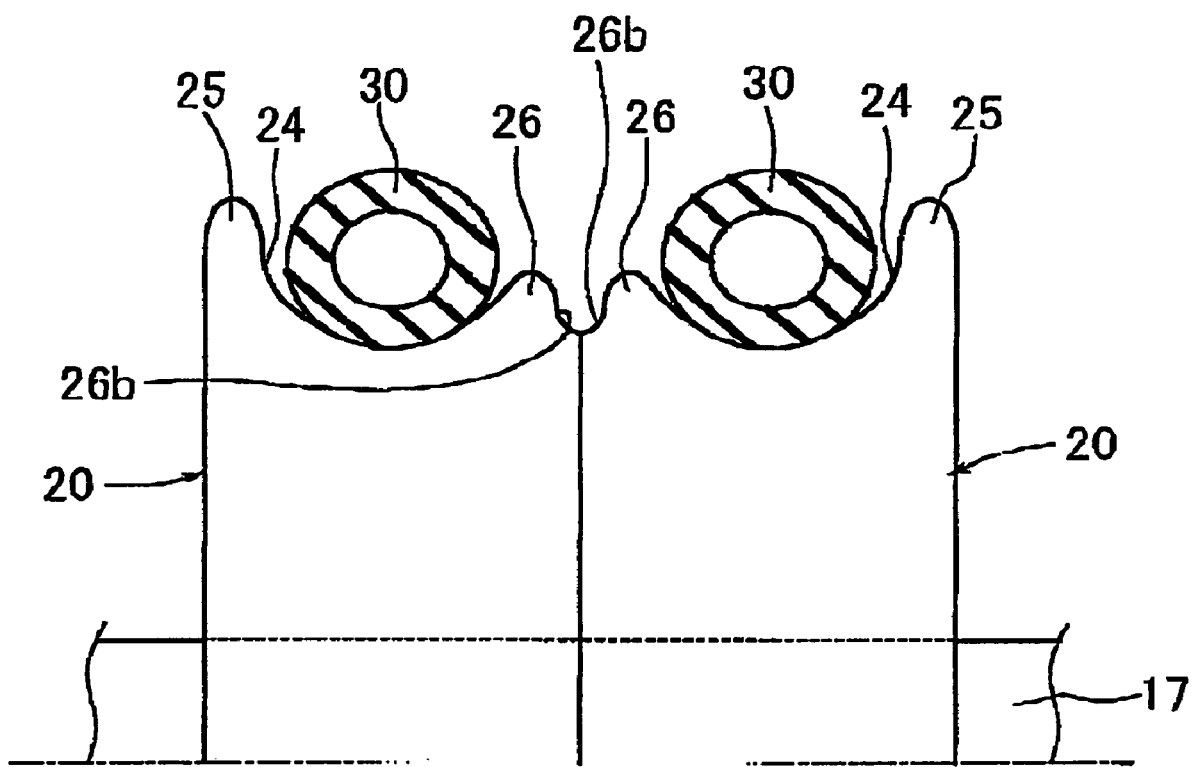
FIG. 9 is an explanatory view of a hydraulic pipe mechanism according to a fourth preferred embodiment.

A third preferred embodiment according to the present invention will be described. In the third preferred embodiment as shown in FIG. 8, the two intermediate hose pulleys 20A (refer to FIG. 7) used in the above-described second preferred embodiment are interposed in parallel between a pair of the hose pulleys 20 the above-described first preferred embodiment (refer to FIG. 4). In the third preferred embodiment, the four hydraulic hoses 30 are appropriately guided by four hose pulleys, namely, the hose pulleys 20, 20A. Meanwhile, the three intermediate hose pulleys 20A or more can be provided in the similar manner to the third preferred embodiment A fourth preferred embodiment will be described. In the fourth preferred embodiment as shown in FIG. 9, a notch-like grooves 26b is formed in the outer peripheries of the facing small radius flanges 26 of a pair of the hose pulleys 20 of the above-described first preferred embodiment (refer to FIG. 4).

Figure 10:
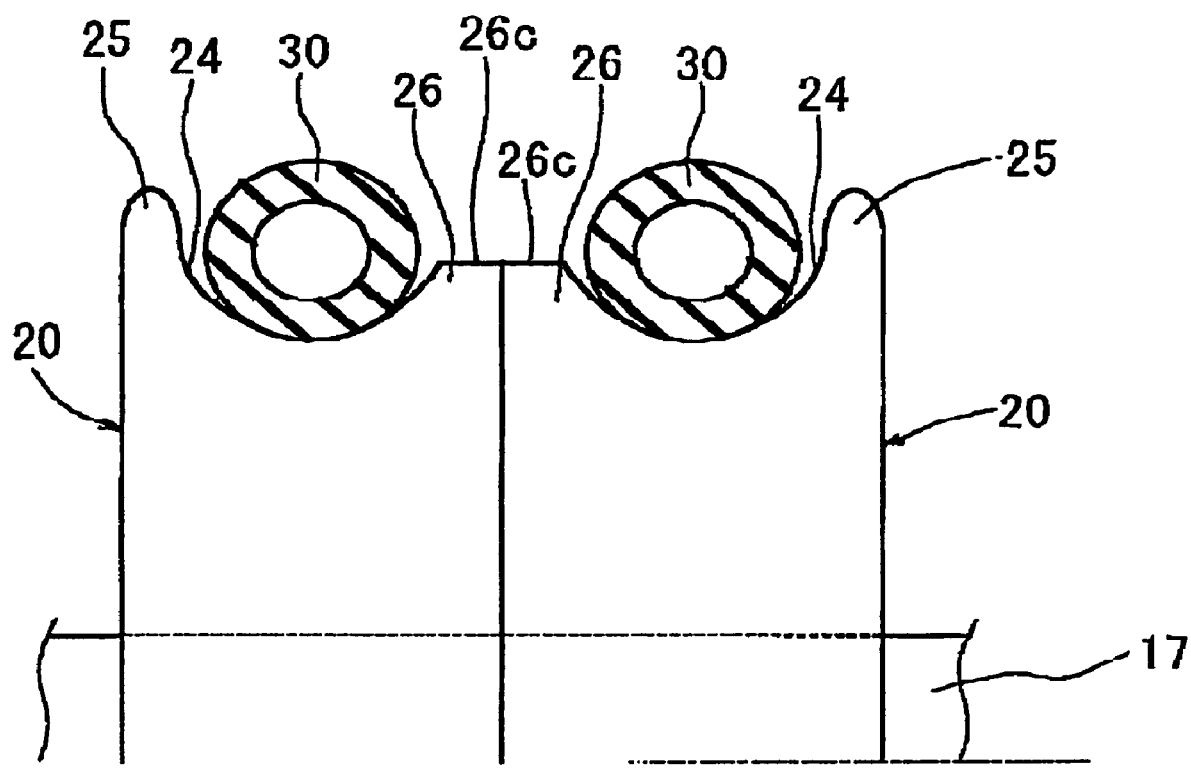
FIG. 10 is an explanatory view of a hydraulic pipe mechanism according to a fifth preferred embodiment.
Figure 11:
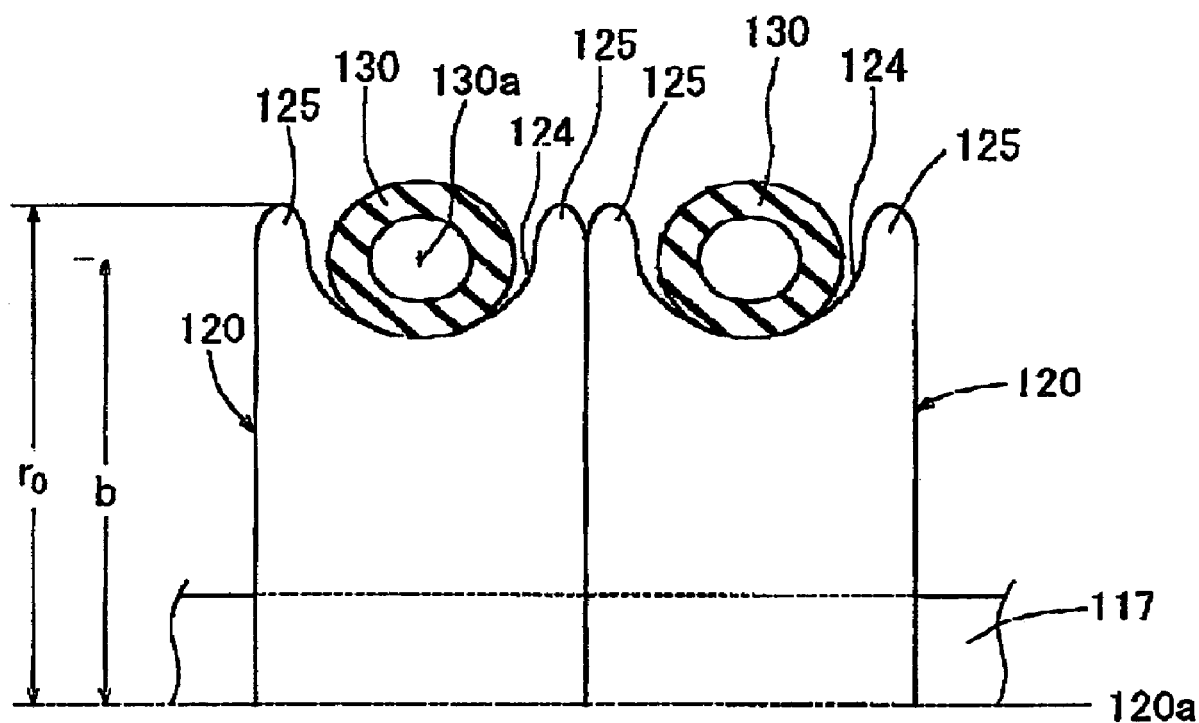
FIG. 11 is an explanatory view of a hydraulic pipe mechanism according to prior art.

A fifth preferred embodiment will be described. In the fifth preferred embodiment as shown in FIG. 10, an outer peripheral closed surface 26c is formed in each small radius flange 26 of a pair of the hose pulleys 20 of the above-described first preferred embodiment in parallel to the rotational axis of the hose pulley 20 and has a predetermined width.

The present invention is not limited to the above-mentioned preferred embodiments, and following alternative embodiments may be practiced according to the present invention. The present invention is not limited to the hydraulic pipe mechanism in the forklift truck and is applied to the hydraulic pipe mechanism in the industrial vehicle other than the forklift truck and to the hydraulic pipe mechanism that is not utilized for the front attachment.

Therefore, the present examples and embodiments are to be considered as illustrative and not restrictive and the invention is not to be limited to the details given herein but may be modified within the scope of the appended claims.

What is claimed is:

1. A hydraulic pipe mechanism for an industrial vehicle comprising:

a pulley shaft;

a plurality of hydraulic hoses; and a pulley set provided on the pulley shaft, the pulley set having at least first and second hose pulleys that are rotatably supported on the pulley shaft, the first and second hose pulleys being respectively located on sides of the pulley set, each of the first and second hose pulleys having a guide groove for hooking the hydraulic hose therein, each of the first and second hose pulleys having a pair of outer and inner flanges that form side walls of the guide groove respectively, each outer flange being located on the side of the pulley set, each inner flange being located inside the outer flange in the pulley set, each outer flange having a first radius, each inner flange having a second radius, wherein the first radius is larger than the second radius, wherein each of the first and second hose pulleys has a rotational axis, each of the hydraulic hoses having an axis, each guide groove having a groove bottom, wherein the first radius is larger than a first dimension from the rotational axis of the hose pulley to the axis of the hydraulic hose, the first radius being smaller than a second dimension from the rotational axis of the hose pulley to an outer periphery of the hydraulic hose, the second radius being larger than a third dimension from the rotational axis of the hose pulley to the groove bottom of the guide groove, the second radius being smaller than the first dimension.

2. The hydraulic pipe mechanism according to claim 1, wherein the pulley set further includes a third hose pulley interposed between the first and second hose pulleys, the third hose pulley having a pair of flanges with the second radius.

3. The hydraulic pipe mechanism according to claim 2, wherein the third hose pulley includes a boss having a shaft hole through which the pulley shaft is interposed, a rim that forms a pair of the flanges, and a plurality of arms that connect the boss to the rim.

4. The hydraulic pipe mechanism according to claim 2, wherein the pulley set further includes the additional third hose pulley.

5. The hydraulic pipe mechanism according to claim 1, wherein each of the first and second hose pulleys has a rotational axis, each of the hydraulic hoses having an axis, wherein the hydraulic pipe mechanism is constructed so as to satisfy the following inequality:

$$W_1 > W_2 > r$$

wherein $W_1$ denotes a dimension from a standard line that is orthogonal to the rotational axis of the hose pulley and the axis of the hydraulic hose to an outer peripheral surface of the outer flange, $W_2$ denotes a dimension from the standard line to an outer peripheral surface of the inner flange, and r denotes a radius of the hydraulic hoses.

6. The hydraulic pipe mechanism according to claim 1, wherein the pulley set is symmetrically formed.

7. The hydraulic pipe mechanism according to claim 1, further comprising an additional pulley set.

8. The hydraulic pipe mechanism according to claim 1, wherein a groove is formed in outer peripheral surfaces of the inner flanges of the first and second hose pulleys.

9. The hydraulic pipe mechanism according to claim 1, wherein each of the first and second hose pulleys has a rotational axis, a closed surface being formed at a predetermined width in each inner flange of the first and second hose pulleys in parallel to the rotational axis.

10. The hydraulic pipe mechanism according to claim 1, wherein each of the first and second hose pulleys includes a boss having a shaft hole through which the pulley shaft is interposed, a rim that forms the outer and inner flanges, and a plurality of arms that connect the boss to the rim.

\* \* \* \* \*

UNITED STATES PATENT AND TRADEMARK OFFICE
CERTIFICATE OF CORRECTION

PATENT NO.         : 7,410,435 B2
APPLICATION NO.    : 10/899527
DATED              : August 12, 2008
INVENTOR(S)        : Masashige Yoshikawa It is certified that error appears in the above-identified patent and that said Letters Patent is hereby corrected as shown below:

Column 1, line 20, please delete "are easy to slide laterally" and insert therefore -- slide laterally easily --;

Column 3, line 60, please delete "Each hose pully 20 rotate" and insert therefore -- Each hose pulley 20 rotates --;

Column 4, line 23, please delete ""the large radius flange 25," and insert therefore -- "the large radius flange 25", --;

Column 4, lines 35 and 40, please delete "inequality is satisfied." and insert therefore -- inequality is satisfied: --;

Column 4, line 58, please delete "pair of bars 28 is respectively" and insert therefore -- pair of bars 28 respectively --;

Column 4, line 62, please delete "prevent that the lift chain 15 is unhooked" and insert therefore -- prevent the lift chain 15 from being unhooked --;

Column 4, lines 63-64, please delete "by traveling a vehicle" and insert therefore -- by a traveling vehicle --;

Column 5, lines 1-2, please delete "prevent that the hydraulic hoses 30 is unhooked" and insert therefore -- prevent the hydraulic hoses 30 from being unhooked --;

Column 5, line 3, please delete "by traveling the vehicle." and insert therefore -- by a traveling vehicle. --;

Column 5, line 7, please delete "pulleys 20 each two" and insert therefore -- pulleys 20, each two --;

Column 5, line 35, please delete "it is prevented that the large radius flanges 25 disturb" and insert therefore -- the large radius flanges 25 do not disturb --;

Column 6, line 13, please delete "pulley 20A is small," and insert therefore -- pulley 20A are small, --;

Column 6, line 25, please delete "the three intermediate hose pulleys 20A or more can be" and insert therefore -- three or more intermediate hose pulleys 20A can be --;

UNITED STATES PATENT AND TRADEMARK OFFICE
CERTIFICATE OF CORRECTION

PATENT NO. : 7,410,435 B2
APPLICATION NO. : 10/899527
DATED : August 12, 2008
INVENTOR(S) : Masashige Yoshikawa It is certified that error appears in the above-identified patent and that said Letters Patent is hereby corrected as shown below:

Column 6, line 26, please delete "provided in the similar manner to the third preferred embodiment" and insert therefore -- provided in a similar manner to the third preferred embodiment. --;

Column 6, lines 29-30, please delete "a notch-like grooves 26b is formed" and insert therefore -- notch-like grooves 26b are formed --;

Column 6, line 40, please delete "and following alternative" and insert therefore -- and the following alternative --;

Column 6, lines 42-43, 44 and 45, please delete "the hydraulic pipe mechanism" and insert therefore -- a hydraulic pipe mechanism --;

Column 6, lines 43 and 45, please delete "the forklift truck" and insert therefore -- a forklift truck --;

Column 6, line 44, please delete "the industrial vehicle" and insert therefore -- an industrial vehicle --; and Column 6, line 46, please delete "the front attachment" and insert therefore -- a front attachment --.

Signed and Sealed this

Tenth Day of November, 2009

David J. Kappos
*Director of the United States Patent and Trademark Office*